(12) United States Patent
Bienvenu

(10) Patent No.: US 6,616,730 B1
(45) Date of Patent: Sep. 9, 2003

(54) METHOD AND DEVICE FOR ACTIVATING A PHYSICAL AND/OR A CHEMICAL REACTION IN A FLUID MEDIUM

(76) Inventor: Gérard Bienvenu, Chemin des Vigny, Sevraz, F-74250 Viuz-en-Sallaz (FR)

(*) Notice: Subject to any disclaimer, the term of this patent is extended or adjusted under 35 U.S.C. 154(b) by 0 days.

(21) Appl. No.: 09/889,150
(22) PCT Filed: Feb. 8, 2000
(86) PCT No.: PCT/FR00/00295
§ 371 (c)(1), (2), (4) Date: Jul. 12, 2001
(87) PCT Pub. No.: WO00/47318
PCT Pub. Date: Aug. 17, 2000

(30) Foreign Application Priority Data

Feb. 8, 1999 (FR) .............................. 99 01658

(51) Int. Cl.⁷ .............................. C22B 3/02; C22B 3/22
(52) U.S. Cl. ..................... 75/724; 75/730; 266/101; 266/170
(58) Field of Search .................. 75/730, 724; 266/101, 266/170

(56) References Cited

U.S. PATENT DOCUMENTS

| | | | |
|---|---|---|---|
| 3,154,411 A | 10/1964 | Back et al. | |
| 4,071,225 A | 1/1978 | Holl | |
| 4,338,169 A | * 7/1982 | Bienvenu | ................. 75/730 |
| 4,632,315 A | 12/1986 | Watanabe et al. | |
| 5,222,808 A | 6/1993 | Sugarman et al. | |
| 5,227,138 A | 7/1993 | Boyd et al. | |

FOREIGN PATENT DOCUMENTS

| | | |
|---|---|---|
| EP | 0 014 109 A1 | 8/1980 |
| FR | 2 752 385 A | 2/1998 |
| GB | 1048789 A | 11/1966 |

* cited by examiner

Primary Examiner—Melvyn Andrews

(57) ABSTRACT

It is possible to activate a physical reaction and/or a chemical reaction in a medium, comprising a solution and solid matter that is freely dispersed in said solution, by placing the mixture in a reactor that has two walls which are located opposite close to each other, whereby the mixture fills the space in between the two walls and forms therein a thin long layer in a direction that is defined by a geometrical axis parallel to the walls, by activating an agitating means that are disposed outside the reactor and capable of acting through said walls on an area of agitation covering part of the layer and having a small dimension in the direction of the geometrical axis, and by simultaneously displacing said agitating means in such a way that the area of agitation substantially spans the entire area located between the two walls.

9 Claims, 4 Drawing Sheets

METHOD AND DEVICE FOR ACTIVATING A PHYSICAL AND/OR A CHEMICAL REACTION IN A FLUID MEDIUM

BACKGROUND OF THE INVENTION

The invention relates to a method and a device for activating a physical or chemical reaction, enabling the kinetics of the reaction to be increased. It relates in particular to a process enabling precipitation of metals diluted in solutions, which consists in:

disposing the mixture in a reactor having two walls facing one another and close to one another, the mixture filling the space between the two walls and forming therein a layer of small thickness and of great length in a direction defined by a geometric axis parallel to the walls, agitating the solution by activation of an agitating means arranged outside the reactor to act through said walls on an agitation zone covering a part of said layer and having a small dimension in the direction of the geometric axis, and moving the agitating means so that the agitation zone spans appreciably the whole of said space located between the two walls.

STATE OF THE ART

The document EP-A-0,014,109 describes a process and a device enabling physical and/or chemical reactions to be fostered in a fluid medium by subjecting a magnetic substance, dispersed in the fluid and playing a physical and/or chemical role in the reaction to be fostered, to a variable magnetic field. The magnetic field is created by means of different electromagnetic coils arranged outside a recipient or reactor containing the fluid medium and the magnetic substance. The reactor is a revolution cylinder. The coils are preferably arranged on several levels of the reactor in the heightwise direction so that the application zone of the magnetic field covers a large portion of the reactor, with several electromagnets per level.

For certain of the physical and/or chemical reactions to be fostered by the process and device described above, the maximum linear velocity of the fluid in the reactor proves determinant for the efficiency of the reaction and has to remain fairly low. This is the case in particular for cementation reactions. What is referred to here as cementation is the process consisting in replacing a relatively noble metal $M_N$ present in a solution in ionic form by a more reactive metal $M_R$ introduced in solid form, according to a precipitation reaction of the type:

In a reaction of this type, the kinetics of the process are a function of the surface offered by the solid reactive metal and of the noble metal concentration of the solution. It is therefore preferable to ensure rapid renewal of the solution in contact with the reactive metal so that the solution in the vicinity of the reactive metal is not depleted in noble metal ions. It is at the same time preferable to increase the reaction surface. However, if the size of the reactive metal particles is decreased too much in order to increase their reaction surface, it becomes difficult to ensure a sufficient relative flow velocity of the solution with respect to the reactive metal particles to prevent depletion of the solution mentioned above. Moreover, too high a flow velocity does not enable the solution to be treated in a single run, which means that the solution has to be passed several times over the same reactive metal bed, mixing it each time with non-treated solution. To achieve optimal kinematics and global efficiency, a compromise therefore has to be found between the size of the reactive metal particles and the relative velocity of the solution with respect to these particles. It is also necessary to prevent precipitation of the noble metal taking place at the surface of the reactive metal, for in this case the reaction would be quickly passivated.

When the activation process by electromagnetic fields described above is implemented within the scope of cementation reactions aiming to extract a noble metal such as copper, by means of iron used as reactive metal, application of an alternating magnetic field enables agitation of the solution and speeding-up of its kinetics to be achieved. However, the mean linear velocity of the solution in the active part of the reactor subjected to the magnetic field must, for the reasons explained above, remain within a range whose upper bound is low. To give a precise idea, if three levels of four pairs of electromagnets are used, as described in the document EP-A-0,014,109, with a solution containing 3 g/l of copper, the mean linear velocity of the solution is about 12 cm/s only.

Given this constraint, it is the cross-section of the active part of the reactor which determines the reactor flow rate. In a device of this kind however, the reactor cross-section is greatly limited by the power of the available electromagnets. In practice, the diameter used does not exceed 16 cm, whence a maximum flow rate not exceeding 10 m³/hr. These performances are far from those expected industrially for metallurgical processes if we consider that for an industrial installation enabling for example 5,000 tons of copper to be produced per annum from a solution containing 3 g/l of copper, a flow rate of 190 m³/hr is necessary, requiring with the technology described 20 reactors totalling 240 pairs of electromagnets. The high costs arising from the electromagnets should be underlined, which disqualify this type of technology. The electromagnets do in fact constitute an expensive item in the investment budget. Furthermore they have a high operating cost as they give rise to large energy expenses, not forgetting servicing and maintenance costs.

The exchange surface between the reactive metal and the solution has moreover been attempted to be improved by means of fluidised beds. An example of implementation of these fluidised beds is described in the Patent U.S. Pat. No. 3,154,411. In this embodiment, nearly 99% of the copper dissolved in a solution is extracted. However, the iron used reacts greatly with the acidity of the medium with the consequence of a large amount of hydrogen being given off and a reduced iron yield. Moreover, this process is not continuous and the copper cements are rich in iron. Furthermore, Swiss Patent No. 9827/72 discloses that the difficulties proper to fluidised beds can be overcome by performing cementation of metals such as Cu, Cd, Co, etc. on zinc granules fluidised in a mechanically agitated reactor. In this embodiment, the exchanges are excellent and the precipitated metals are driven out of the fluidised bed whereas the larger zinc granules stagnate there until they reach a very small size. The drawback of this system lies in the difficulty of implementing reliable mechanical agitation in a tubular reactor of large height. Any mechanical system placed in such conditions is chemically attacked and abraded by the cements. To operate, these systems have to implement delicate embodiments such as bearings kept constantly under pressure of a pure and neutral solution.

The document U.S. Pat. No. 5,227,138 relates to a device designed to displace a biological liquid in a capillary tube wherein a ferromagnetic piston driven externally by a permanent magnet is made to move. This device is intended for biological uses.

The document U.S. Pat. No. 5,222,808 describes a mixture of two liquids in a capillary tube. It makes use of a magnetic agitation system using one or more magnetic cores moved by a variable external magnetic field. The magnetic cores are formed by microscopic powders which are directed in the field lines forming aggregates. This device is also intended for biological uses.

OBJECT OF THE INVENTION

The object of the present invention is to reduce the drawbacks proper to the remote activation technologies described above. Its object is to achieve a cementation process of metals with optimum yield. Its object is to propose an installation with a high unitary processing capacity. Its object is also to enable greater agitation of the fluid solution involved in the reaction to be activated while limiting the number and cost of the activation means.

The activation process according to the invention is characterized in that:

solid ferromagnetic particles fluidised in the current of the solution are used, being the seat of a deposition when the cementation reaction takes place, the particles having a predetermined granulometry, the solution is injected via the bottom of the reactor causing an ascending flow of the solution in a vertical direction parallel to the walls, whereas the solid ferromagnetic particles are introduced at the top part of the fluidised bed.

A The impacts caused between the solid ferromagnetic particles and the reactor walls enable the metallic deposits to be detached continuously.

Preferably, the agitating means is moved in an alternating movement between a first extreme position and a second extreme position situated in such a way that the agitation zone is able to appreciably span the whole of said portion of space. The movement of the agitating means can be limited to a to-and-fro translation movement. The processing capacity is high, as there is no limitation of the cross-section of the reactor, which can have the required width or diameter to treat a given flow rate of solutions while preserving a limited air-gap. The agitating means comprise a plurality of electromagnets sequentially supplied with periodic currents to create an electromagnetic field able to direct the ferromagnetic particles alternately in two distinct directions. The thin layer of fluid in the active zone enables a maximum effect of the magnetic forces to be obtained while also having a high flow rate which is not possible in cylindrical embodiments of the state of the art.

Alternatively or cumulatively, other agitating means can be provided, for example at least one ultrasonic transducer, at least one of said walls being lined with a flexible membrane containing a gel able to transmit the ultrasounds, said transducer having a head in contact with said flexible membrane.

According to another feature of the invention, the object of the latter is also to achieve a device for implementation of the process described above and comprising means for introducing the solution via the bottom of the reactor causing an ascending flow of the solution in a vertical direction parallel to the walls, whereas the solid ferromagnetic particles are introduced at the top part of the fluidised bed.

According to an alternative embodiment, the device comprises means for injecting reactive metal wires able to be used for injecting liquid chemical adjuvants.

Preferably, both of the walls are shaped in such a way that their external surface is geometrically defined by a set of segments of straight lines parallel to one and the same geometric axis and bearing on any curve extending in a plane perpendicular to said axis, the distance between each segment of one of the walls and the other wall being constant. This geometrical definition covers in particular the case where both the walls are flat or cylindrical with a circular base.

Preferably, the device comprises in addition drive means for driving the fluid in a driving direction parallel to said geometric axis, the walls comprising, on their faces facing one another, asperities forming restrictions designed to cause local accelerations of the fluid.

The invention is mainly applicable to cementation of non-ferrous metals, both in the primary metallurgy sector and in that of decontamination of ground surfaces and of solutions charged with heavy metals.

BRIEF DESCRIPTION OF THE DRAWINGS

Other advantages and features of the invention will become more clearly apparent from the following description of different embodiments of the invention given as non-restrictive examples only and represented in the accompanying drawings in which.

DESCRIPTION OF A PREFERRED EMBODIMENT

Figure 1:
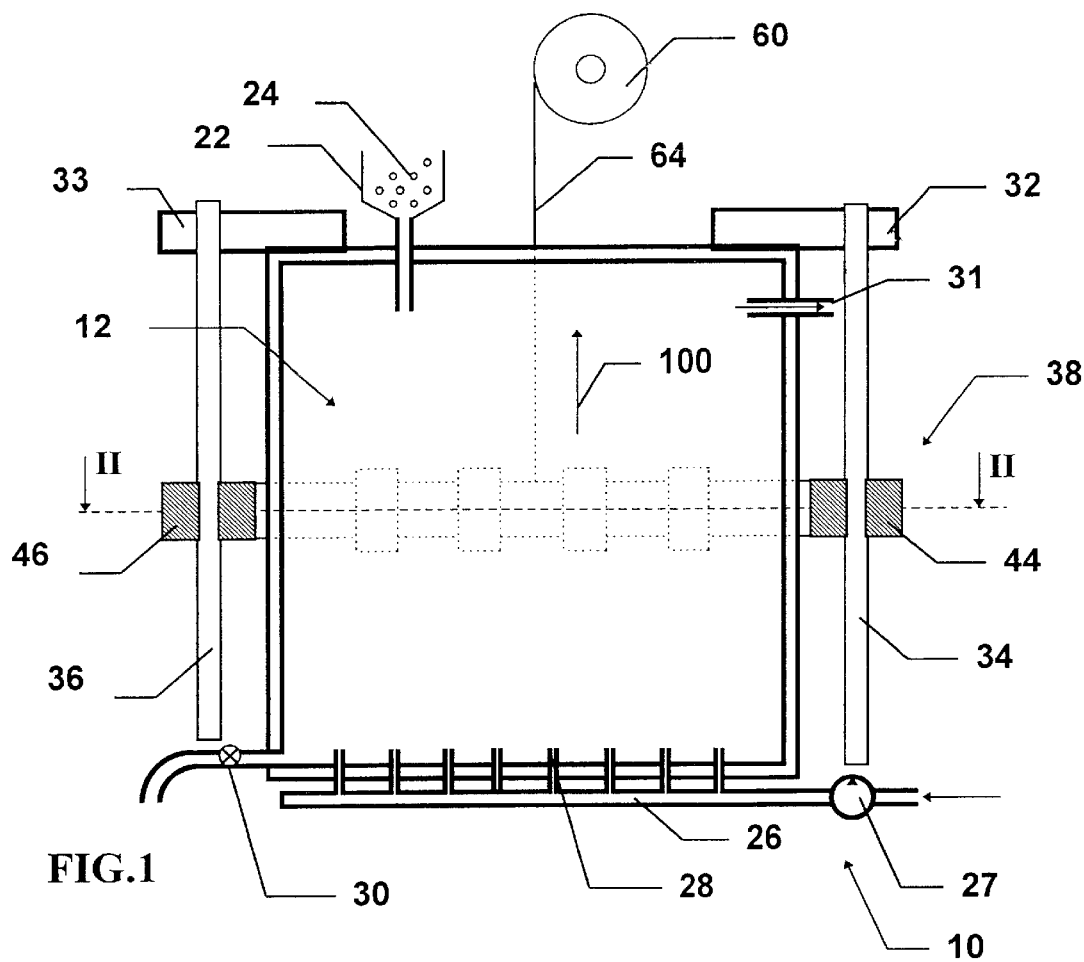
FIG. 1 schematically represents a device according to a first embodiment of the invention, in cross-section along a vertical plane.
Figure 2:
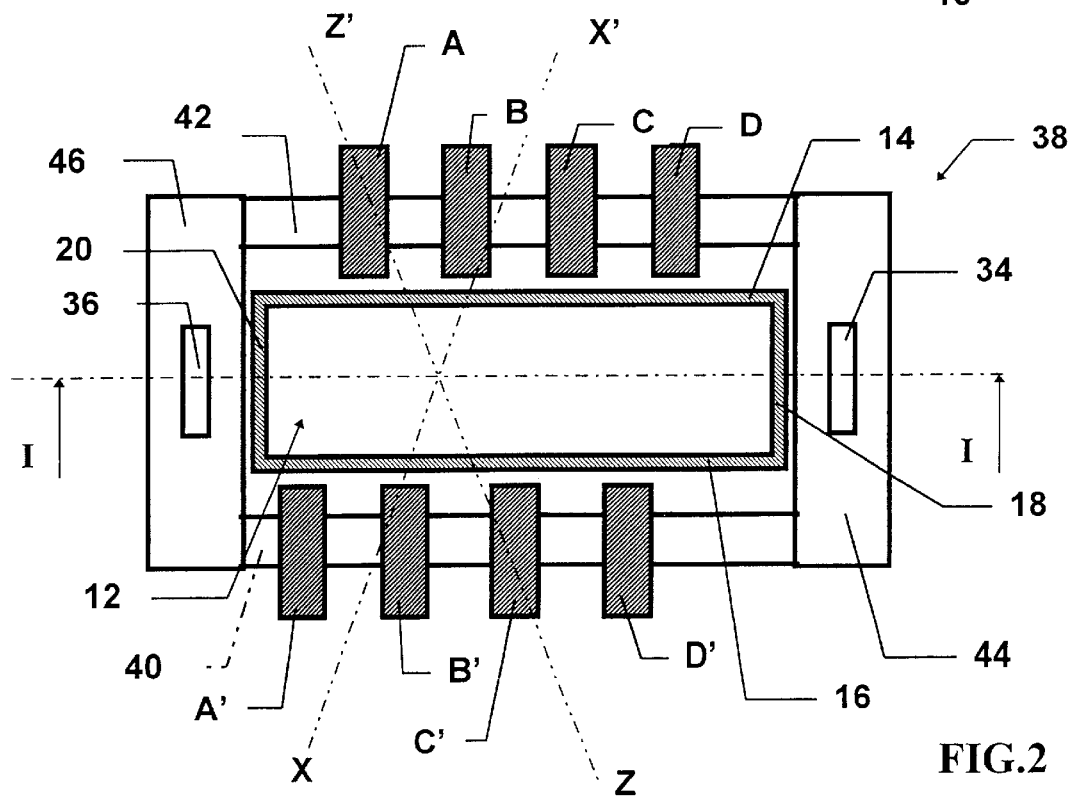
FIG. 2 represents a cross-section along the plane II—II of FIG. 1.
Figure 3:
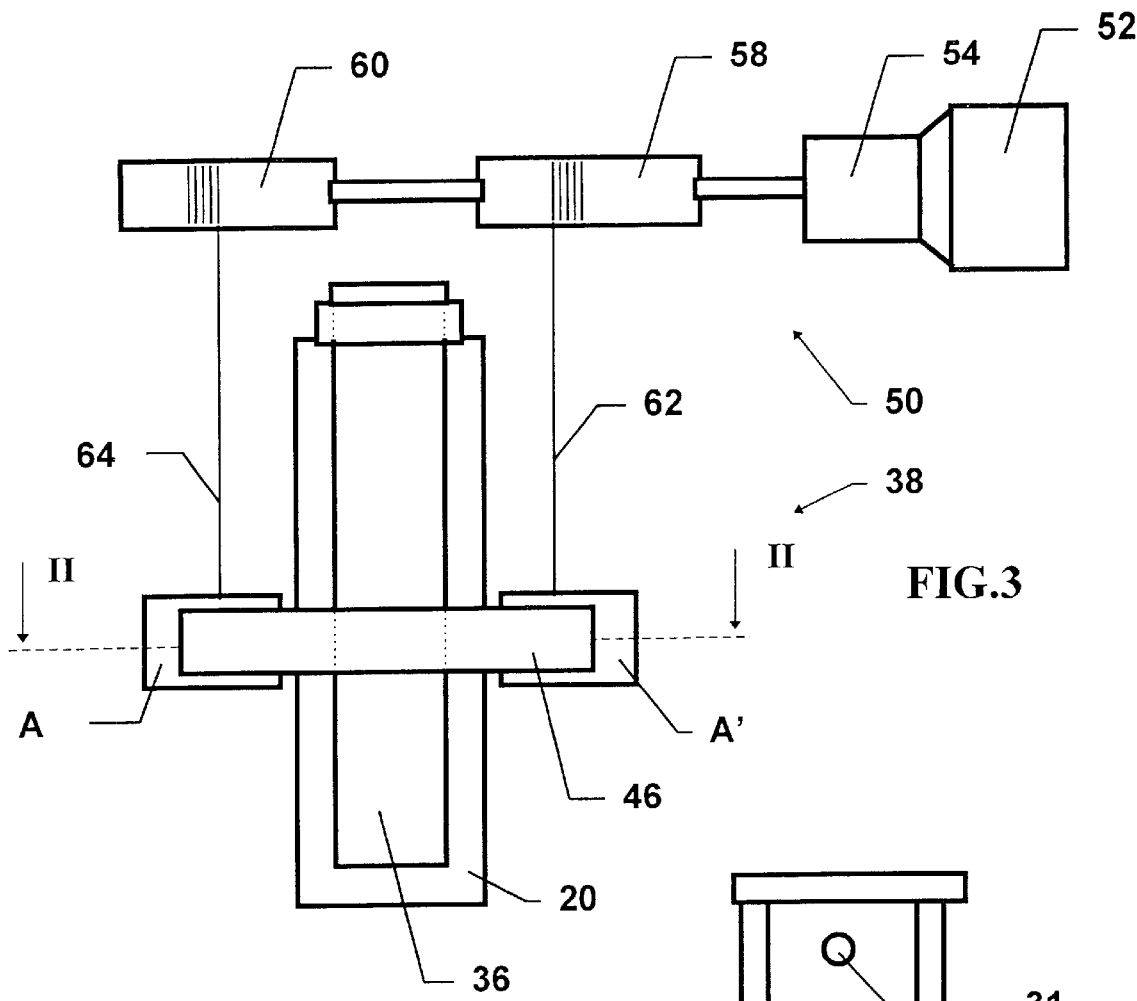
FIG. 3 represents a side view of the device of FIG. 1.

With reference to FIGS. 1 to 3, an activation installation 10 of a cementation reaction comprises a reactor 12 of rectangular cross-section in a plane perpendicular to that of FIG. 1, forming a recipient, with two flat large walls 14, 16 facing one another and two walls of small dimensions 18, 20. Each of the large walls measures 2 meters in height and 16 centimeters in width. The distance between the two large walls is about 4 cm.

The cover forming the top face of the reactor is equipped with a loading hopper 22 designed to feed the reactor with iron balls 24 constituting the reactive metal in this instance. The bottom face is equipped with a feed pipe 26 located downstream from a pump 27 and equipped with injection nozzles 28. The solution charged with the noble metal to be extracted is able to be introduced by means of this pipe. The reactor can be drained by means of a valve 30. An outlet pipe 31 is located in the upper part of the reactor. Flow of the mixture in the recipient formed by the reactor is therefore ascending and globally follows a vertical direction 100 parallel to the flat walls 14, 16.

Two fixing flanges 32, 33 are arranged on the cover of the reactor, each supporting a side rail 34, 36. These rails guide in translation a carriage 38 formed by two longitudinal girders 40, 42 and two cross-members 44, 46, surrounding the reactor 12, the cross-members comprising linear bearings operating in conjunction with the rails 34, 36. The carriage 38 supports in the example four pairs of electromagnets A, A', B, B', C, C' and D, D', the poles whereof are connected to one another by cores made of laminated silicon steel plate.

The installation also comprises a driving device 50 of the carriage, constituted by an electric motor 52 equipped with a speed variator coupled to a reducing gear train 54 the output shaft 56 whereof drives two coaxial cylinders 58, 60 acting as winches. A cable 62, 64 links each of the winches 58, 60 to one of the longitudinal girders 40, 42.

The device operates in the following manner:

The electromagnets are excited periodically pair by pair for example (AA') then (BB') then (CC') then (DD') then (DC') then (CB') then (BA') so as to cross the field lines and force the ferromagnetic particles to be directed alternately in the two directions xx' and zz' as indicated in FIG. 2. Excitation of the electromagnets is controlled by means of a programmable controller in the previously indicated order.

At the same time, the carriage 38 supporting the electromagnets moves slowly downwards and upwards in a direction parallel to the axis 100. The periodicity of the electromagnet support carriage is such that it performs one back-and-forth movement in a time comprised between 10 seconds and 2 minutes.

By co-ordinating the movement of the carriage 38 and the excitation of the electromagnets, it is possible to program the agitation to make it maximum in the most critical zones such as those situated at the level of the solution injectors 28. By optimum adjustment of the excitation times and the speed of the electromagnet support carriage 38, it is also possible to partially force the particles situated at the bottom of the fluidised bed to move up towards the top. This presents an advantage as the upper part of a fluidised bed is always a zone of small activity and high porosity (few particles present and small particle size).

To illustrate the effect of electromagnetic activation, cementation tests of a diluted copper solution were carried out with the reactor of FIGS. 1 to 3. The solution initially contained 2.5 g/l of copper in sulphate form in solution in sulphuric acid at pH 1.5.

A first test was carried out in a simple fluidised bed without any magnetic field action. The reactor had previously been loaded with 25 kg of iron balls with a diameter of 3 mm. The solution, the initial volume whereof was 1 m$^3$, was injected at a rate of 2.5 m$^3$/hour. After 25 minutes, an account of the passage of the solution in the fluidised bed was made. The copper cements were decanted, washed and filtered on a Buchner filter then dried and weighed. The content of the analysed solution after the first run was 0.43 g/l. The quantity of cement weighed was 1.72 kg, the rest of the copper having remained fixed on the iron balls contained in the bed. The pH of the solution increased from 1.5 to 1.97. The iron content of the copper after remelting was analysed and was found to be equal to 2%.

The iron granules contained in the bed were washed with water for 1 hour under magnetic activation so as to remove the residual copper. 0.260 kg of copper was collected which represented a copper yield of 95.6%. The iron content of the solution was analysed and found to be equal to 2.36 g/l which enabled the value of the iron yield to be established at 74%.

The same test was repeated under strictly identical conditions but with the electromagnets excited according to the following cycle: excitation for 30 μs in the order AA', BB', CC', DD' followed by a 15 μs pause then excitation again for 30 μs in the order DC', CB', BA' followed by another 15ps pause before restarting the cycle. At the same time, the carriage was moved at a constant speed of 10 cm/s in a to-and-fro movement from one end of the reactor to the other.

This time 2.205 kg of copper were recovered containing 1.1% of iron in the form of cements, i.e. an extraction yield of about 98.6%. The iron content measured in the solution was then 1.95 g/l and the final pH was equal to 1.53. The iron yield calculated from the analyses of the solution was then 96% against 74% in the previous test.

Figure 4:
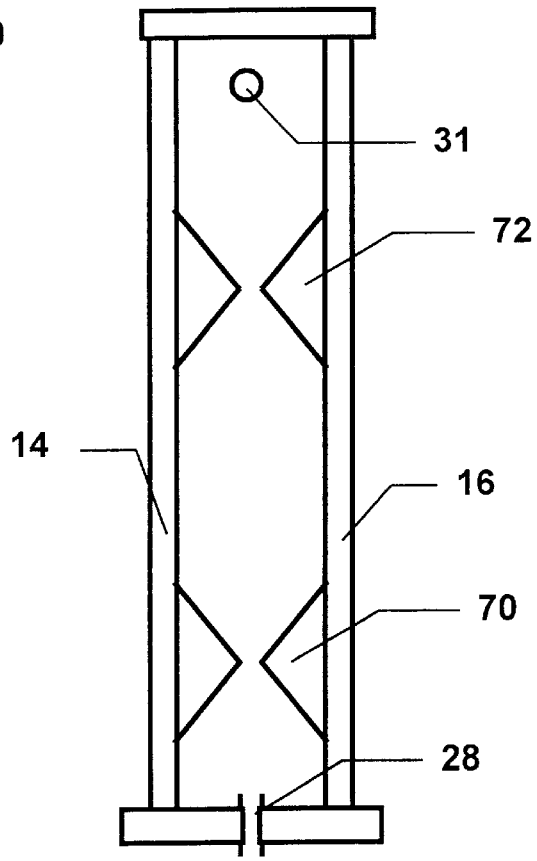
FIG. 4 represents a cross-section of a device according to a second embodiment of the invention.

According to a second embodiment of the invention, illustrated by FIG. 4, the reactor 12 is modified so as to provide the two large walls 14, 16 with asperities, for example, one or more restrictions forming venturis and designed to cause a local acceleration of the fluid. In practice, two venturis 70, 72 are positioned 60 cm and 120 cm from the bottom of the reactor. The venturis are formed by polypropylene strips folded and welded as indicated in FIG. 4. The slit of the venturis is 1.5 cm wide and their height is 20 cm.

To illustrate the influence of the venturis, two series of tests were carried out. In these sections of the reactor, the velocity was increased from 11 cm/s to about 30 cm/s over 10 cm, then dropped back from 30 to 11 cm/s over the 10 cm above. To increase the turbulence in the venturis a certain proportion of large particles were placed in the two upper compartments, i.e. 0.8 kg of large shot with a granulometry of about 4.5 mm in each of the compartments, which represented a proportion of the charge of about 6%.

The first test was carried out without activation of the electromagnets. 2.12 kg of copper cement containing 1.3% of iron were recovered after passing 1 m$^3$ of solution, i.e. a quantity of copper recovered of 2.09 kg. The copper content of the solution was measured at 0.345 g/l. The quantity of cements remaining on the iron was evaluated by weighing at 0.14 kg. The final iron content of the solution was 2.06 g/l and the pH was 1.63. The iron yield was therefore about 89.5%;

The same experiment was repeated but with the electromagnets activated. 2.25 kg of copper cement containing 1.12% of iron were then recovered, which corresponds to a recovery yield of 98.5%. The iron content of the solution was measured at 1.985 g/l, i.e. a yield of about 97.5%. The pH of the solution hardly varied as it went from 1.5 to 1.52.

Figure 5:
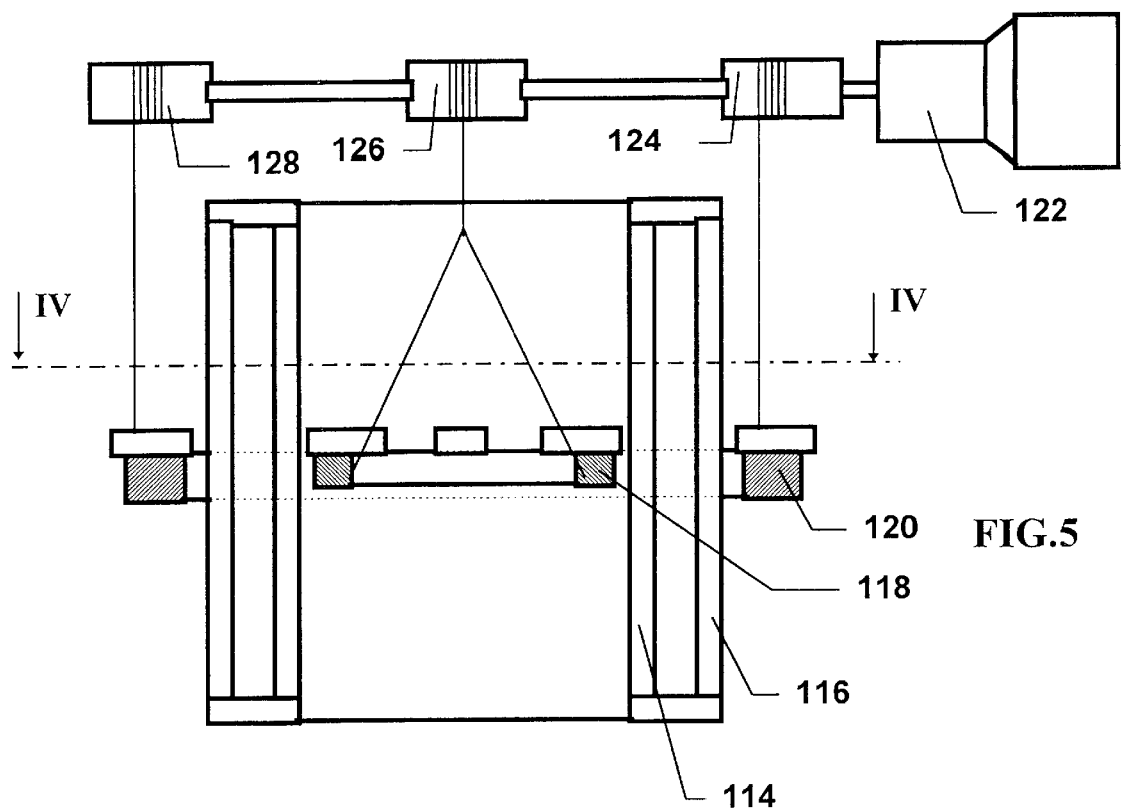
FIG. 5 represents a cross-section of a device according to a third embodiment of the invention.
Figure 6:
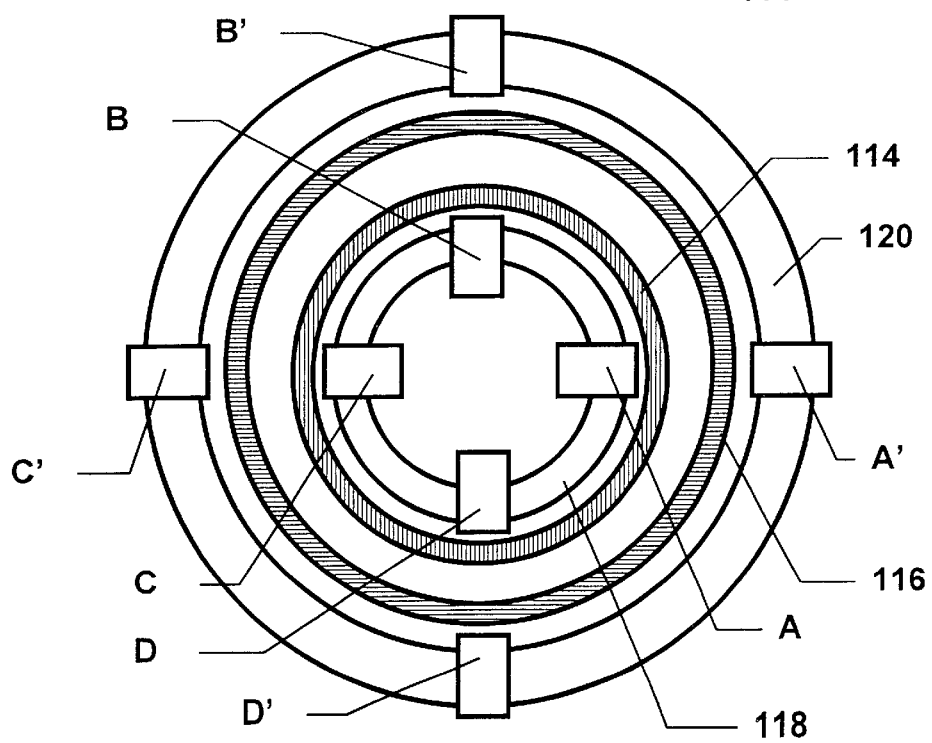
FIG. 6 represents a cross-section along the plane VI—VI of FIG. 5.

According to a third embodiment of the invention, illustrated by FIGS. 5 and 6, the reactor 112 has a crown-shaped cross-section. The solution to be treated is contained between an inside wall 114 and an outside wall 116, both cylindrical. The distance between the two walls, which determines the thickness of the solution layer, is about the same as in the previous example, i.e. 4 cm. Two carriages 118, 120 are then required to support the electromagnets. Movement of the two carriages is coordinated by a common geared motor 122 driving three coaxial winches 124, 126, 128. The cable of the inner carriage comprises four slings.

Figure 7:
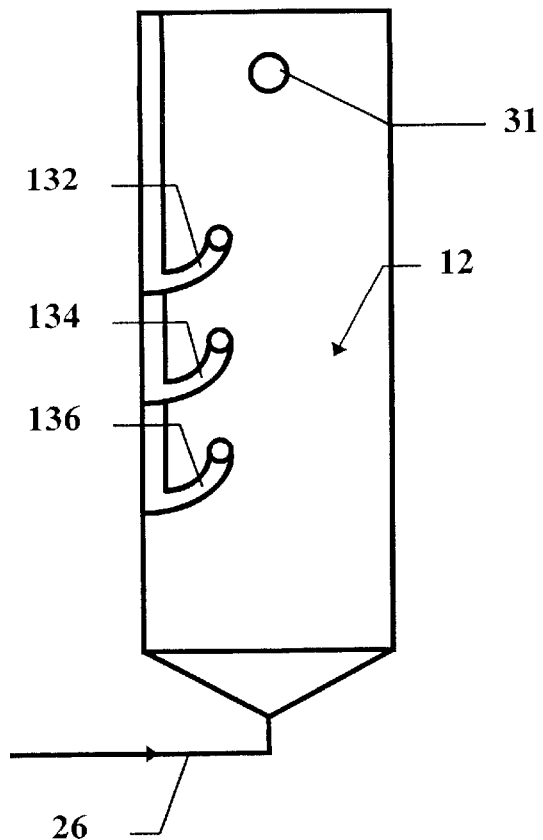
FIG. 7 represents a cross-section of a device according to a fourth embodiment of the invention.

According to a fourth embodiment of the invention, illustrated by FIG. 7, the apparatus enables indirect cementation to be implemented by using a much more reactive metal than iron, such as zinc or aluminium for example. To do this, the reactive metal (zinc or aluminium) is introduced continuously into the reactor in the form of wires which are unwound in guides 132, 134, 136 opening out into the reactor 12. The guides are formed by polymer (polypropylene, polyethylene . . . ) tubes. Two or three guides are placed per meter of width. The wires then invade the reaction zone in which they form skeins which increase the turbulence and offer a large contact surface with the iron balls which take a potential close to that of the wire. Under these conditions, the metals can precipitate over the whole surface of the iron balls in direct or indirect contact with the wires. The iron balls than only act as mechanical agitator whereas the wire is consumed and is regularly replaced by unwinding thereof in the reactor.

Figure 8:
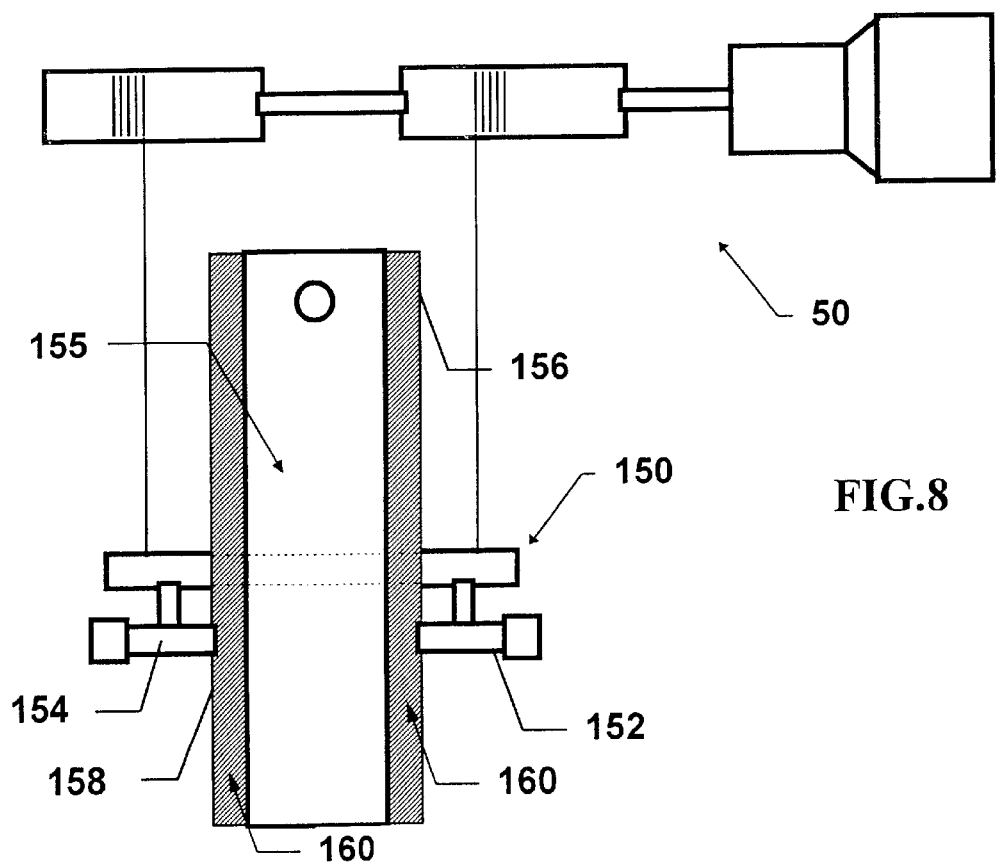
FIG. 8 represents a cross-section of a device according to a fifth embodiment of the invention.

According to a fifth embodiment of the invention, represented schematically in FIG. 8, the moving carriage 150 is equipped with ultrasonic transducers 152, 154 designed to bring about activation by ultrasounds. Application of ultrasounds is possible due to the very design of the reactor in a thin strip. In this case, to enable the ultrasonic waves to propagate through the fluidised bed, the transducer heads have to be in permanent contact with the medium. To do this, a double shell is placed on the reactor 155, which is therefore lined with two flexible membranes 156, 158 containing a gel 160, such as those used for performing echographies or a colloidal silicone gel or any other form of gel.

From the economics standpoint it is more costly to achieve an ultrasonic activator than an electromagnetic activator, but it may be worthwhile whenever any presence of iron or ferromagnetic material is to be avoided.

Naturally the invention is not limited to the examples of embodiments presented above. In particular, the recipient acting as reactor can take any form enabling two walls of large height and constant cross-section to be defined by a plane perpendicular to the direction of translation of the carriage, at a small distance from one another. Thus, if the direction of linear movement of the carriage is chosen as reference axis, it appears that each of the large walls of the reactor must be a shell, in the geometrical sense of the word, the envelope whereof is a cylindrical portion of surface whose generating lines extend in a longitudinal direction. What is meant here by cylindrical portion of surface is a surface formed by a set of segments of straight lines parallel to the reference axis and bearing on any curve forming its base line. The base line curve can itself be a segment of a straight line, as illustrated by the reactor of FIGS. 1 to 3, or a circle, as illustrated by the reactor of FIGS. 5 and 6.

Furthermore, the large walls can be of any dimensions. For an industrial use for example, walls 4 meters in width and 4 meters in height, arranged at a distance of 10 cm from one another, enable a flow rate of 190 m/hour, and therefore of 5,000 tons/year for a solution with 3 g/l of copper, to be obtained with a mean linear velocity of the fluid of about 12 cm/sec. Satisfactory activation is then obtained with 80 pairs of electromagnets. If it was chosen to manufacture cylindrical crown reactors, the dimensions would be comprised between 1.3 and 2.6 meters in diameter.

What is claimed is:

1. A process for activating a physical and/or chemical reaction in a mixture subjected to agitation and comprising a solution charged with a noble metal in ionic form and a reactive metal introduced in solid form and freely dispersed in the solution so as to obtain a cementation from the reactive metal reacting to the noble metal present in the solution, comprising:

injecting the solution via the bottom of a reactor having two walls facing one or another and close to one another, the mixture filling the space between the two walls and forming therein a layer of small thickness and of great length in a direction defined by a geometric axis parallel to the walls, an agitating means movably attached to the reactor including a plurality of electromagnets, the electromagnets being arranged outside the reactor to act through said walls on an agitation zone covering a part of said layer and having a small dimension in the direction of the geometric axis;

causing an ascending flow of the solution in a vertical direction parallel to the walls so as to form a fluidised bed;

introducing solid ferromagnetic particles, at the top part of the fluidised bed, which particles are the seat of a disposition when the cementation reaction takes place, agitating the mixture by activating the electromagnets sequentially supplied with periodic currents to create an electromagnetic field able to direct the ferromagnetic particles alternately in two distinct directions;

moving the agitating means in an alternating movement between a first extreme position and a second extreme position so that the agitation zone spans appreciably the whole of said space located between the two walls; and cementing the noble metal from the mixture.

2. A device for implementing the process according to claim 1, for activating a physical and/or chemical reaction in a mixture subjected to agitation and comprising a solution charged with a noble metal in ionic form and a reactive metal introduced in solid form and freely dispersed in the solution so as to obtain a cementation consisting in replacing the noble metal present in the solution by said reactive metal, a device comprising:

a reactor designed to contain the mixture to be agitated, the reactor having two walls facing one another and close to one another, the mixture filling the space between the two walls and forming therein a layer of small thickness and of great length in a direction defined by a geometric axis parallel to the walls, causing an ascending flow of the solution in a vertical direction parallel to the walls so as to form a fluidised bed, means for injecting the solution via the bottom of the reactor, means for causing an ascending flow of the solution in a vertical direction parallel to the walls, means for introducing solid ferromagnetic particles at the top part of the fluidised bed, which particles are the seat of a deposition when the cementation reaction takes place, agitating means comprising a plurality of electromagnets sequentially supplied with periodic currents to create an electromagnetic field able to direct the ferro-magnetic particles alternately in two distinct directions, the electromagnets being arranged outside the reactor to act through said walls on an agitation zone covering a part of said layer and having a small dimension in the direction of the geometric axis, and means for moving the electromagnets in an alternating movement between a first extreme position and a second extreme position so that the agitation zone spans appreciably the whole of said space located between the two walls.

3. The device according to claim 2, comprising means for introducing the reactive metal in the form of metallic wires.

4. The device according to claim 3, wherein the means for introducing the reactive metal comprise guides opening out into the reactor.

5. The device according to claim 4, wherein the guides are formed by polymer tubes.

6. The device according to claim 2, wherein both of the walls are shaped in such a way that their external surface is defined geometrically by a set of segments of straight lines parallel to one and the same geometric axis and bearing on any curve extending in a plane perpendicular to said axis, the distance between each segment of one of the walls and the other wall being constant.

7. The device according to claim 6, wherein both of the walls are flat or cylindrical with a circular base.

8. The device according to claim 2, wherein the walls comprise asperities forming restrictions, inside the space bounded by the walls, designed to cause local accelerations of the solution.

9. The device according to claim 2, comprising a support carriage of the electro-magnets, the means for moving the electromagnets comprising means for driving the carriage.

* * * * *